(12) United States Patent
Rawlings

(10) Patent No.: US 9,388,627 B2
(45) Date of Patent: Jul. 12, 2016

(54) METHOD OF MANUFACTURING AN INSULATED FRAME MEMBER

(71) Applicant: Architectural & Metal Systems Limited, Little Island, County Cork (IE)

(72) Inventor: David Rawlings, Bishops Cleeve (GB)

(73) Assignee: ARCHITECTURAL & METAL SYSTEMS LIMITED, Little Island (IE)

( * ) Notice: Subject to any disclaimer, the term of this patent is extended or adjusted under 35 U.S.C. 154(b) by 157 days.

(21) Appl. No.: 13/894,273

(22) Filed: May 14, 2013

(65) Prior Publication Data

US 2013/0247486 A1    Sep. 26, 2013

Related U.S. Application Data

(62) Division of application No. 12/828,008, filed on Jun. 30, 2010, now abandoned.

(30) Foreign Application Priority Data

Jul. 15, 2009   (IE) ..................................... 2009/0538

(51) Int. Cl.
*E06B 3/964* (2006.01)
*E06B 3/263* (2006.01)
(Continued)

(52) U.S. Cl.
CPC ................. *E06B 3/263* (2013.01); *B29C 39/22* (2013.01); *B29C 44/1285* (2013.01); *E06B 3/26303* (2013.01); *E06B 3/26307* (2013.01); *E06B 2003/26316* (2013.01); *E06B 2003/26325* (2013.01); *E06B 2003/26352* (2013.01);
(Continued)

(58) Field of Classification Search
CPC . E06B 3/263; E06B 3/26301; E06B 3/26303; E06B 3/2632; E06B 2003/26378; E06B 2003/26383; E06B 3/267; E06B 3/2675
USPC ............... 29/897.32, 897.312, 530; 52/309.4, 52/309.5, 578, 656.1, 656.2, 656.5, 656.6, 52/717.02
See application file for complete search history.

(56) References Cited

U.S. PATENT DOCUMENTS 3,832,818 A   9/1974 Nahr
3,861,085 A   1/1975 Jacob
(Continued)

FOREIGN PATENT DOCUMENTS

CA    2672202 A    7/2008
DE    4424865 A1   1/1996
(Continued)

OTHER PUBLICATIONS

US Office Action, received in U.S. Appl. No. 12/282,008, dated Aug. 27, 2012, in 15 pages.
(Continued)

*Primary Examiner* — David Bryant
*Assistant Examiner* — Jun Yoo
(74) *Attorney, Agent, or Firm* — Knobbe Martens Olson & Bear LLP

(57) ABSTRACT

A method of manufacturing an insulated frame member including first and second frame components held in a spaced relationship by a first, glazing unit facing connector component and by a second connector component, the first and second frame components together defining a void substantially filled with a foamed material, wherein the first connector component is of width greater than or equal to the thickness of the glazing unit.

11 Claims, 1 Drawing Sheet

(51) Int. Cl.
*B29C 39/22* (2006.01)
*B29C 44/12* (2006.01)

(52) U.S. Cl.
CPC ............... *E06B2003/26361* (2013.01); *E06B 2003/26387* (2013.01); *Y10T 29/49993* (2015.01)

(56) References Cited

U.S. PATENT DOCUMENTS

| | | |
|---|---|---|
| 4,069,631 A | 1/1978 | Nahr |
| 4,096,678 A | 6/1978 | Diels et al. |
| 4,219,983 A | 9/1980 | Kern et al. |
| 4,524,112 A | 6/1985 | Willert |
| 4,841,696 A * | 6/1989 | Miller ............... 52/202 |
| 5,117,601 A | 6/1992 | Habicht |
| 5,216,810 A | 6/1993 | Kendall |
| 6,035,596 A | 3/2000 | Brunnhofer |
| 6,035,600 A | 3/2000 | Habicht et al. |
| 6,202,353 B1 | 3/2001 | Giacomelli |
| 7,104,019 B2 | 9/2006 | Brunnhofer |
| 7,987,633 B2 | 8/2011 | Lenox et al. |
| 8,051,622 B2 | 11/2011 | Dampierre |
| 8,112,941 B2 | 2/2012 | Lenox et al. |
| 8,286,396 B2 * | 10/2012 | Brunnhofer et al. ....... 52/204.71 |
| 2002/0046539 A1 | 4/2002 | Schulz |
| 2005/0115193 A1 | 6/2005 | Brunnhofer |
| 2006/0018095 A1 | 1/2006 | Rawlings |
| 2008/0245027 A1 | 10/2008 | Lambertini |
| 2010/0146883 A1 * | 6/2010 | Benkel ............... 52/204.64 |

FOREIGN PATENT DOCUMENTS

| | | |
|---|---|---|
| DE | 4424928 C1 | 3/1996 |
| DE | 9422032 U1 | 11/1997 |
| DE | 20313884 U1 | 11/2003 |
| DE | 102004038868 A1 | 2/2006 |
| DE | 202007004804 U1 | 6/2007 |
| EP | 0007416 | 2/1980 |
| EP | 0799964 A1 | 10/1997 |
| EP | 0848781 A | 6/1998 |
| EP | 1154115 A1 | 11/2001 |
| EP | 1255019 A2 | 11/2002 |
| FR | 2792676 A1 | 10/2000 |
| WO | WO 97/22779 A | 6/1997 |
| WO | WO 98/40594 A1 | 9/1998 |
| WO | WO 00/71849 A1 | 11/2000 |

OTHER PUBLICATIONS

Extended European Search Report in Application No. EU 10251161.5, dated Dec. 18, 2012.
Great Britain Search Report in Application No. GB 1010696.1, dated Sep. 29, 2010.
Great Britain Search Report in Application No. GB 1010696.1, dated Jun. 20, 2013.
European Office Action for European Application No. 10251161.5 dated Nov. 10, 2015 in 5 pages.

* cited by examiner

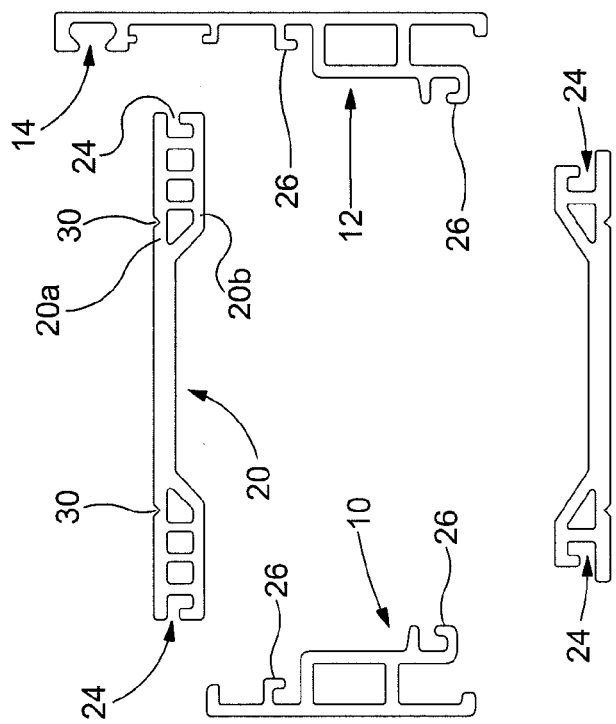
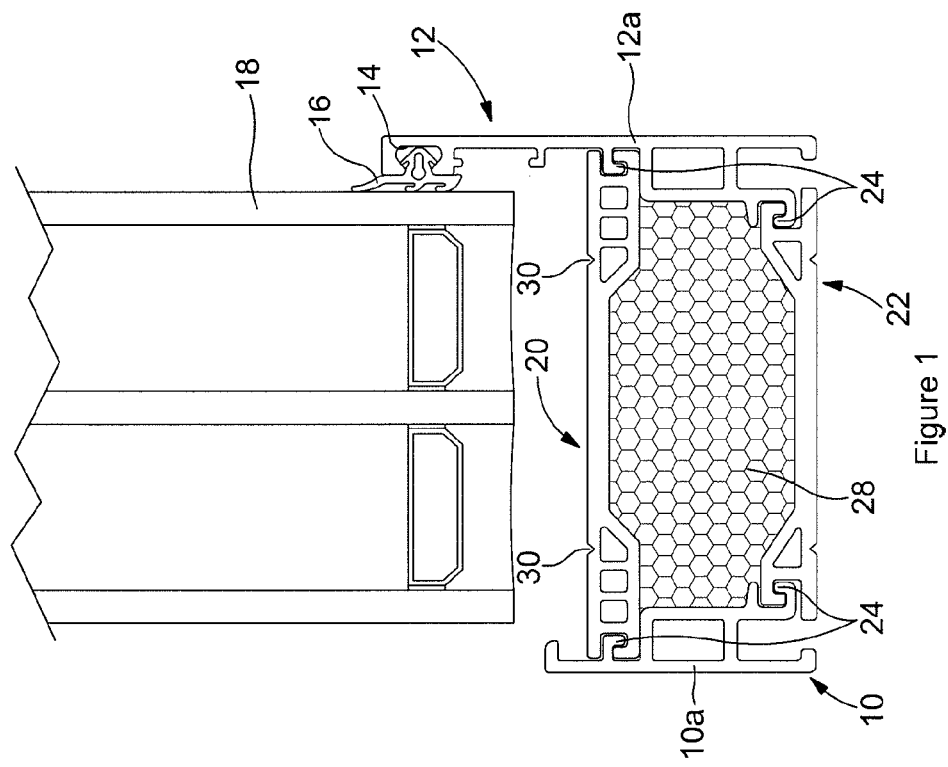

METHOD OF MANUFACTURING AN INSULATED FRAME MEMBER

CROSS-REFERENCE TO RELATED APPLICATIONS

This application is a divisional application of U.S. patent application Ser. No. 12/828,008, filed on Jun. 30, 2010, which claims priority under 35 U.S.C. §119 to Ireland Patent Appl. No. 2009/0538, filed on Jul. 15, 2009, which is incorporated in its entirety by reference herein.

BACKGROUND

1. Field

This invention relates to an insulated frame member suitable for use in the formation of a window or door frame or the like. In particular, the invention relates to an insulated frame member of the type including first and second, or inner and outer, elongate metallic frame components and a thermal break interconnecting the frame components.

2. Description of the Related Art

One type of insulated frame member is described in EP 0007416 and comprises inner and outer extruded aluminum frame components which are interconnected by a pair of plastics material connector components in such a manner as to define an elongate void bounded by the frame components and connector components, the void being filled by a foamed insulating material. During manufacture, the foamed material expands to fill the void and to lock together the frame components and connector components to form a strong, rigid thermal break between the frame components. The frame member is also of good strength and rigidity.

SUMMARY

According to certain embodiments of the invention, there is provided an insulated frame member comprising first and second frame components held in a spaced relationship by a first, glazing unit facing connector component and by a second component, the first and second frame components together defining a void substantially filled with a foamed material, wherein the first connector component is of width greater than or equal to the thickness of the glazing unit.

As a result, radiation and convection losses from the glazing unit to the frame components can be reduced.

Preferably the first connector component extends from an outer wall of the outer frame component to an inner wall of the inner frame component.

Certain embodiments of the invention further relate to a door or window frame manufactured from at least one such frame member.

BRIEF DESCRIPTION OF THE DRAWINGS

Certain embodiments of this invention will further be described, by way of example, with reference to the accompanying drawings, in which:

FIG. 1 is a sectional view illustrating an insulated frame member in accordance with one embodiment of the invention; and FIG. 2 is an exploded view illustrating parts of the embodiment of FIG. 1.

DETAILED DESCRIPTION

It is desirable to enhance the thermal efficiency of buildings. One area that is important in achieving good thermal efficiency is in the construction of window and door frames. One object of certain embodiments of the invention is to provide an insulated frame member suitable for use in meeting the PassivHaus standard, although certain other embodiments of the invention are suitable for use in other applications.

Although the insulated frame member of EP 0007416 described above includes a thermal break which may be effective in reducing the conduction of heat between the inner and outer frame components, it is thought to be unsuitable for complying with more up-to-date, stringent requirements and so is unsuitable for reaching the PassivHaus or other modern standards.

The insulated frame member illustrated in FIGS. 1 and 2 comprises an inner extruded metallic frame component 10 and an outer extruded metallic frame component 12. Although specific profiles are illustrated in the accompanying drawings, it will be appreciated that the invention is not restricted to these specific profiles, but rather extends to a number of modifications and alterations thereto. The outer frame component 12 includes an outer wall 12a and is shaped to define a recess 14 adapted to receive part of a sealing gasket 16 which seals, in use, against the outer face of a glazing unit 18. In the arrangement illustrated, the glazing unit 18 is of the triple glazed form. However, it will be appreciated that the invention is not restricted to such arrangements and that it is equally applicable to, for example, double-glazed arrangements. The inner frame component 10 includes an inner wall 10a and is adapted to have secured thereto a glazing bead (not shown) which bears against the opposing surface of the glazing unit 18, in use, to secure the glazing unit 18 in position.

The inner and outer frame components 10, 12, are held in a spaced relationship by first and second connector components 20, 22. The connector components 20, 22 are each of extruded form, being manufactured from a suitable plastics material. Each of the connector components 20, 22 is shaped to define mounting recesses 24 which, in use, receive corresponding mounting formations 26 of the inner and outer frame components 10, 12.

As shown in FIG. 1, it will be appreciated that the assembly of the inner and outer frame components 10, 12 and first and second connector components 20, 22 defines a void of elongate form which, as shown in FIG. 1, is filled with a foamed insulating material 28.

It will be appreciated that the provision of the first and second connector components 20, 22 and foamed insulating material 28 connecting the inner and outer frame components 10, 12 to one another provides a good thermal break resisting the conduction of heat energy between the inner and outer frame components 10, 12. The first connector component 20 which faces the glazing unit 18, in use, extends across substantially the full width between the inner wall 10a of the inner frame component 10 and the outer wall 12a of the outer frame component 12, and thus is of width greater than the thickness of the glazing unit 18. As a result, it will be appreciated that most heat energy radiating from the edges of the glazing unit 18 will not be incident upon a relatively good thermal conductor in the form of part of one or other of the frame components 10, 12, but rather will be incident on a plastics component of poor thermal conductivity. Radiation losses are thus reduced. By reducing radiation of heat energy from the glazing unit 18 to the frame components 10, 12 it will be appreciated that the thermal efficiency of the insulated frame member is enhanced. Further, convection losses in the space between the frame member and the glazing unit 18 are reduced.

As illustrated, the first connector component 20 is provided with mounting locations 30 in the form of grooves to assist in the correct location of, for example, friction stay tracks or other components. Typically, such components are secured in position using screws. As the first connector component 20 is of double walled form at these locations, including an outer wall 20a and an inner wall 20b, it will be appreciated that such screws are firmly secured in position, the dual wall formation of that part of the connector component 20 providing additional anchorage for the screws as well as enhancing the stability of the screws.

During assembly of the insulated frame member, the first and second connector components 20, 22 are secured to the inner frame component 10 by sliding the first and second connector components 20, 22 onto the inner frame component 10 from one end thereof, the formations 26 being introduced into the recesses 24 of the connector components 20, 22. It will be appreciated that the combination of the inner frame component 10 and connector components 20, 22 together defines an open channel into which a thermally insulating foaming material is introduced. The outer frame component 12 is then secured to the first and second connector components 20, 22 by sliding the outer frame component 12 into position in a manner similar to that by which the connector components 20, 22 are secured to the inner frame component 10. Shortly after the outer frame component 12 is secured in position, the thermally insulating foaming material will have commenced foaming and will fill the void defined between the connector components 20, 22 and frame components 10, 12. The foaming and expansion of the thermally insulating foaming material 28 serves to lock together the frame and connector components 10, 12, 20, 22 enhancing the rigidity of the frame member as well as providing a thermal break therebetween.

Alternatively, the frame and connector components 10, 12, 20, 22 may be assembled to form an elongate component defining an elongate void, and liquid foaming material may be injected into the void, for example from an end thereof or through one or more openings formed in one or other of the components, for example through an opening formed at the mid-point of the assembly. Such an arrangement requires the use of less equipment during assembly and lends itself to being supported in a static jig to maintain straightness during foaming, although this may not always be necessary.

In the arrangement illustrated, the void is of symmetrical form, thus during foaming the foam will tend to apply equal opposite pressures to the aluminum sections, assisting in maintaining straightness with minimal use of jigs.

In use, the frame member can be used in the construction of door or window frames or the like and the invention extends not only to the insulated frame member itself but also to frames manufactured therefrom. If desired, a reverse butt joint can be used, where appropriate, as the connector components 20, 22 are shaped in such a manner that the thermal break is substantially symmetrical.

It is envisaged that when used with a triple glazed glazing unit 18, a door or window frame formed using the insulated frame member will have a U value of approximately 0.8 and an A energy rating. Such a frame would therefore be suitable for use in a building satisfying the PassivHaus standard. It will be appreciated, however, that the insulated frame member may be used in other applications.

A number of modifications or alterations may be made to the arrangement described hereinbefore without departing from the scope of the invention.

What is claimed is:

1. A method of manufacture of an insulated frame member for supporting a glazing unit, the insulated frame member comprising first and second frame components of a relatively high thermal conductivity material held in a spaced relationship by a first connector component and by a second connector component, the first and second connector components being of a relatively low thermal conductivity material, the first connector component facing towards the glazing unit, in use, the first and second frame components together defining a void substantially filled with a foamed material, the method comprising the steps of:
    (a) assembling the first and second frame components and the first and second connector components by sliding the frame and connector components relative to one another in a longitudinal direction of the frame member to define the void; and
    (b) introducing a foamable material into the void and foaming the foamable material in situ to exert a pressure upon the first and second frame components and upon the first and second connector components, wherein the first connector component is of a width greater than or equal to the thickness of the glazing unit, the first connector component extending from an outer wall of the insulated frame member defined by the first frame component to an inner wall of the insulated frame member defined by the second frame component, wherein the first connector component has longitudinal edges each of which is provided with a pair of spaced projections that define therebetween respective L shaped mounting recesses receiving, in use, corresponding L-shaped mounting formations of the first and second frame components.

2. A method according to claim 1, wherein the void is of a substantially symmetrical form, with respect to a plane parallel to a longitudinal axis of the frame member.

3. A method according to claim 1, wherein the first connector component is provided with an elongate location marking.

4. A method according to claim 3, wherein the first connector component is of double walled form adjacent the elongate location marking.

5. A method according to claim 4, wherein the first connector component is provided with a pair of location markings and associated double walled regions.

6. An insulted frame member manufactured according to the method of claim 1.

7. A frame for at least one of a window and a door, the frame comprising at least one insulated frame member according to claim 6.

8. A frame according to claim 7, further comprising a glazing unit configured to fit within the frame.

9. A method according to claim 1, wherein the liquid foaming material is injected into the void from an end thereof.

10. A method according to claim 1, wherein the liquid foaming material is injected into the void through an opening that opens into the void part way along the length thereof.

11. An insulated frame member for supporting a glazing unit, the insulated frame member comprising first and second frame components of a relatively high thermal conductivity material held in a spaced relationship by a first connector component and by a second connector component, the first and second connector components being of a relatively low thermal conductivity material, the first connector component facing towards the glazing unit, in use, the first and second frame components together defining a void substantially filled with a foamed material, wherein the first connector component is of a width greater than or equal to the thickness of the glazing unit, the first connector component extending from an outer wall of the insulated frame member defined by the first frame component to an inner wall of the insulated frame member defined by the second frame component, wherein the first connector component has longitudinal edges each of which is provided with a pair of spaced projections that define therebetween respective L-shaped mounting recesses receiving, in use, corresponding L-shaped mounting formations of the first and second frame components.

* * * * *